Dec. 25, 1934.  W. H. RICHARDSON  1,985,427
FLEXIBLE FERRULE
Filed Jan. 6, 1934
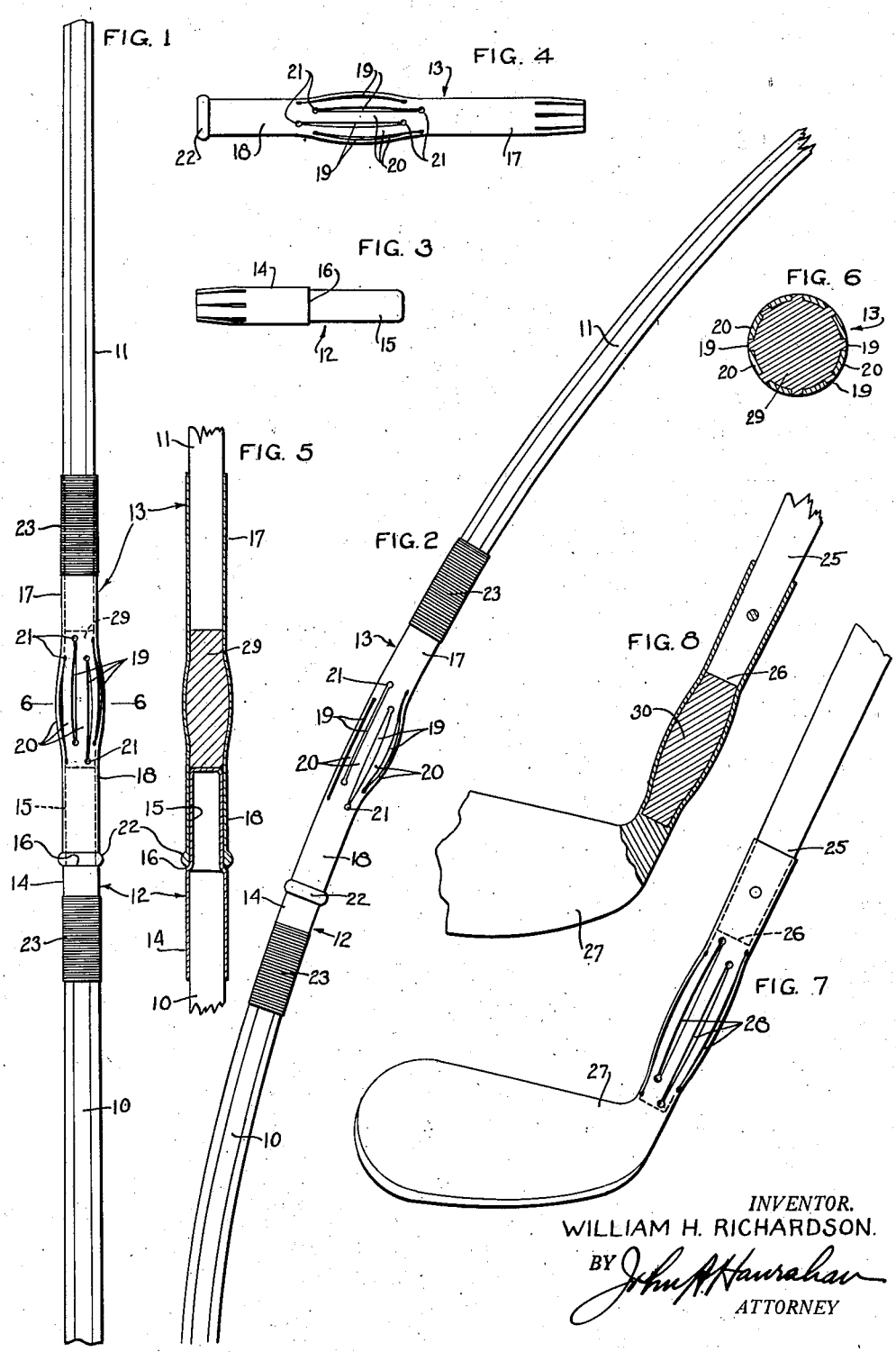
INVENTOR.
WILLIAM H. RICHARDSON.
BY John A. Hanrahan
ATTORNEY Patented Dec. 25, 1934

1,985,427

UNITED STATES PATENT OFFICE 1,985,427

FLEXIBLE FERRULE

William H. Richardson, Hamden, Conn.

Application January 6, 1934, Serial No. 705,638

10 Claims. (Cl. 287—85)

This invention relates to new and useful improvements in flexible ferrules and has particular relation to a flexible ferrule to be used in connecting the sections of a fishing rod.

An object of the invention is to provide a ferrule of improved construction whereby a fishing rod having sections connected by the improved ferrule will not be so likely to break at the ferrules or joints connecting its sections.

Another object is to provide a ferrule which will flex as the rod is flexed whereby the rod will have a substantially uniform flexing action throughout its entire length.

A further object is to provide a ferrule as stated and which is of simple construction, attractive in appearance and of light weight.

Other objects and advantages will become apparent from a consideration of the following detailed description taken in connection with the accompanying drawing wherein a satisfactory embodiment of the invention is shown. However, it will be understood that the invention is not limited to the details disclosed but includes all such variations and modifications as fall within the spirit of the invention and the scope of the appended claims.

In the drawing:

Fig. 1 is an elevational view showing the improved ferrule or joint in use and connecting two adjacent sections of a fish pole;

Fig. 2 is a view somewhat similar to Fig. 1 but showing the condition of the joint with the pole flexed;

Fig. 3 is an elevational view of the male ferrule member;

Fig. 4 is a similar view of the female ferrule member;

Fig. 5 is a longitudinal sectional view through the improved joint;

Fig. 6 is a transverse sectional view, the view being taken substantially along the line 6—6 of Fig. 1;

Fig. 7 is an elevational view illustrating the invention as incorporated in a golf club; and Fig. 8 is a longitudinal sectional view through the device of Fig. 7.

Referring in detail to the drawing, at 10 and 11 are indicated sections of a fishing rod to the adjacent ends of which are attached the male and female members respectively of the ferrule or joint, the said members being designated 12 and 13 respectively. The male ferrule member 12 may have a tubular end portion 14 receiving an end of the rod section 10 and the other end 15 of this member may be tubular or solid as desired and of reduced diameter whereby a shoulder 16 is formed.

The female ferrule member 13 may be formed of tubing and includes an end portion 17 telescopingly receiving an end of the rod section 11 and also includes an end portion 18 of a length substantially equal to the length of the reduced end portion 15 of the male ferrule member. Intermediate its end portions 17 and 18 the ferrule member 13 is provided with longitudinally extending slots 19 between which are formed lands 20. The slots 19 are arranged in staggered relation and at each of its ends each slot terminates in a circular portion 21. It will be understood that the end portion 18 of the ferrule member 13 extends or includes that portion of the member between its free end 22 and the beginning of the slots 19. Also, it will be noted that the free end 22 is pressed to provide a bead.

The slotted portion of member 13 or the lands 20 between the slots 19 of the member 13 are pressed or bowed outwardly whereby the member is somewhat barrel shaped. Members 12 and 13 may be secured to the rod sections 10 and 11 in any desired manner and it is preferred that the members have a tight fit on the rod sections. Rod section 11 enters only into the end portion 17 of member 13 and does not extend any substantial distance into the slotted portion of said member. If desired the members may be cemented to the respective rod sections and may be wrapped with cord as at 23, the cord being tightly wound and shellacked.

As above suggested, the end portion 15 of the male ferrule member is substantially of the same length as the non-slotted end portion 18 of the female ferrule member 13. When connecting the rod sections 10 and 11 the end portion 15 is introduced into the end portion 18 and fits snugly therein and the telescopic engagement is limited since the shoulder 16 of member 12 will abut the bead 22 of the member 13. Therefore, the end portion 15 does not enter into the intermediate slotted portion of the member 13. This slotted portion renders the member 13 flexible and in the use of the rod the joint will flex as indicated in Fig. 2. Such flexing results in the land or lands at the outer side of the curve straightening or flattening while the land or lands at the inner side of the curve are further bulged as clearly shown in said Fig. 2. This improved joint therefore permits of a substantially uniform flexing or bending of the fishing rod without any tendency to stretch the metal at either side of the bend.

Heretofore, the joints or ferrules connecting the adjacent sections of a fishing rod have been so constructed that for the length of the joint or ferrule the rod has been rigid and would not flex for a length of several inches. These joints constitute the weak point or points in the rod since the strains caused by the stoppage of deflection or flexing at the ends of the ferrules causes a concentration of strains at these points and such action is responsible for a large percentage of rod breakage. Should the male ferrule member enter into the slotted intermediate portion of the female ferrule member then flexing is prevented and in the present construction such engagement is prevented and this together with the slotting of the female ferrule section provides a flexible joint or connection between the rod sections whereby deflection may be substantially uniform through the entire length of the rod.

Ferrules have, in the past, been made of brass or German silver both of which are soft metals and since the ferrules are made as thin as possible to reduce weight it has been necessary that the metal of the ferrules be hard drawn and the metal is so strained in this operation that in the case of "punched ferrules" considerable breakage takes place at the shoulder of the male ferrule member. According to the present invention the female ferrule member is made of stainless steel of a grade which can be hardened to a spring temper. The walls of this member are slotted in a section inwardly of its mating end and outwardly of the rod section to which the member is attached. The width of these slots and the wall thickness would, of course, be regulated by measuring the force necessary to deflect a ferrule of a certain size the same distance that the bamboo of a rod deflects when a load is applied.

As above suggested, the slots should run into round holes and are preferably staggered relatively so that bending strain will not be concentrated in sharp corners or in a single line circumferentially of the ferrule. However, when the slots are made all of the same length it is possible to increase the flexibility of the ferrule by having the individual slots of somewhat greater length without increasing the slotted area. The temper must be correct and the lands or strips between adjacent slots should be expanded to a diameter larger than that of the ferrule thereby giving the slotted intermediate section of the ferrule a barreled or slightly bulged appearance. This allows the ferrule to deflect freely since the land at the outer side of the curve straightens and the opposite land or that one at the inner side of the curve is further bulged without a tendency to stretch the metal as above described.

For the male ferrule member it is preferred to use duralumin since it is extremely strong as well as light in weight. With such an arrangement, that is, a female ferrule member of stainless steel, and a male ferrule member of duralumin, the weight of the pair of members would be less than the weight of the corresponding members now used and in a fishing rod a better action would be obtained since the rigid sections of the rod would be reduced by approximately fifty per cent (50%) and the action of the rod would approximate that of a one piece rod. The steel would be of approximately 95,000 pounds per square inch tensile strength and 60,000 pounds per square inch elastic limit, and there would be slight danger of breaking.

Further, the flexing or shock absorber effect of the resilient ferrule will prevent breakage of the rod at the ferrule ends. The female ferrule member being of stainless steel will not rust or tarnish and does not have the hard shiny surface of the chrome plate and can be colored to suit. Of course, if desired, the male ferrule member may be made of stainless steel and if desired it may be slotted.

The principal of the invention as above set forth may be applied in connections other than that above described. For example, it may be incorporated in a golf club as suggested in Figs. 7 and 8. In the construction illustrated the shaft 25 of the club extends into the hosel to the point 26. That portion of the hosel between the shank end 26 and the club head 27 is hollow and longitudinally slotted as at 28. These slots are staggered and the lands between the slots are bulged outwardly so that the head 27 may flex relative to the shaft 25. In this construction the lands at the outer side of the bend will straighten and those at the inner side bulge as above set forth. The hosel is formed of stainless steel and will not become corroded and weakened.

Preferably means are provided to prevent the entrance of dust and moisture into the flexible joint and while such means is useful in connection with the joint when used in a fishing rod it is particularly useful in the golf-club construction. Figs. 5 and 6 best illustrate this means as applied to the fishing rod ferrule and it comprises a block of rubber or the like 29, completely filling the intermediate portion of the female ferrule member between the inner end of the male ferrule member and the inner end of the rod section 10. Further, it will be noted that the rubber body 29 may be vulcanized in place and that it enters into and fills the slots 19.

In Fig. 8 the rubber body is designated 30 and completely fills and seals the slotted portion of the joint or hosel entering into the slots 28 therein and filling said slots. Body or block 30 may be vulcanized in place. It will be understood that the rubber bodies or blocks 29 and 30 completely fill the slotted portions in which they are placed and serve to exclude dust and moisture therefrom, this being particularly useful in the golf club construction where the rubber body extends from the inner end of the shaft or shank 25 to the head of the club. Further, the rubber fillers serve to prevent whistle such as would be caused by air rushing through the slots of the joint when the rod or club is being used. If desired, the ferrule may, either when it is to be applied to the fishing rod or to the golf club, be dipped in a pyralin solution to give it a finished appearance and to seal the slots and further, if desired, to color it. In this connection it is to be noted that neither the rubber bodies or blocks nor the coating of pyralin will interfere with the flexing of the joint.

From the foregoing it is to be understood that in the following claims, the word "ferrule" is used to described a ferrule as the "hosel" of a golf club as well as the ferrule of a fishing rod when said claims are not otherwise limited.

Having thus described the invention, what is claimed is:

1. In a fishing rod ferrule, a male ferrule member adapted to be connected with an end of a section of a fishing rod, a female ferrule member to be connected with an end of a second section of the fishing rod, said female ferrule member including a tubular portion slotted inwardly of one of its end portions to render it flexible, said slots extending longitudinally of said member and staggered so as not to concentrate bending stresses in a single line circumferentially about the member, means to connect said male ferrule member with said end portion of the female ferrule member, and said end portion of the female ferrule member beyond its slots being of such length that its slotted portion is not engaged in making said connection.

2. In a fishing rod ferrule, a male ferrule member adapted to be connected with an end of a section of a fishing rod, a female ferrule member adapted to be connected with an end of a second section of a fishing rod, said female ferrule member including a tubular portion slotted inwardly of one of its end portions to render it flexible, the lands of said ferrule between its slots bowed outwardly whereby on bending of the ferrule the lands at the outer side of the bend flatten while those at the inner side of the bend bulge outwardly, means to connect said male ferrule member with said end portion of the female ferrule member, and said end portion of the female ferrule member beyond said slots being of such length that the slotted portion is not engaged in making such connection.

3. In a flexible coupling, a ferrule including a tubular portion, said portion having longitudinally extending slots therein, said portion having the lands between said slots bulged whereby as the ferrule flexes the lands at the outer side of the bend flatten and those at the inner side of the bend are further flexed, and end portions beyond said slotted portion and of such length as to form connecting portions whereby the flexing of said slotted portion will not be interfered with.

4. In a fishing rod ferrule, a male ferrule member adapted to be connected with an end of a section of a fishing rod, a female ferrule member adapted to be connected with an end of a second section of a fishing rod, said female ferrule member including a tubular portion slotted inwardly of one of its end portions to render it flexible, said slots staggered so as not to concentrate bending stresses in a single line circumferentially about the member, the lands of said ferrule between its slots bowed outwardly whereby on bending of the ferrule the lands at the outer side of the bend flatten while those at the inner side of the bend bulge outwardly, means to connect said male ferrule member with said end portion of the female ferrule member, and said end portion of the female ferrule member beyond its slots being of such length that its slotted portion is not engaged in making said connection.

5. In a connecting means, a member having a tubular longitudinally slotted portion inwardly of one end, a second member, said second member having a portion to engage with said end portion of the first member to connect said members, and said slots stopping short of the free end of the first member a distance substantially equal to the length of the engaging portion of the second member whereby said second member will not engage the slotted portion of the first member and interfere with the flexing of the first member in its slotted portion.

6. In a flexible coupling, a ferrule including a tubular portion, said portion having longitudinally extending slots therein, said portion having the lands between said slots bulged whereby as the ferrule flexes the lands at the outer side of the bend flatten and those at the inner side of the bend are further flexed, and a block of rubber in and filling the slotted portion of said ferrule.

7. In a connecting means, a member having a tubular longitudinally slotted portion inwardly of one end, a second member, said second member having a portion to engage with said end portion of the first member to connect the members, said slots stopping short of said end of the first member a distance substantially equal to the length of the engaging portion of the second member whereby said second member will not engage the slotted portion of the first member and interfere with the flexing of the first member in its slotted portion, a block of rubber in the slotted portion of said first member, and said block of rubber filling said portion and entering into said slots.

8. In a flexible coupling, a ferrule including a tubular portion, said portion having longitudinally extending slots therein, said portion having the lands between said slots bulged whereby as the ferrule flexes the lands at the outer side of the bend flatten and those at the inner side of the bend are further flexed, and flexible means sealing the slots in said first member.

9. In a connecting means, a member having a longitudinally slotted tubular portion and an unslotted portion beyond each end of said slotted portion, a second member, and means connecting the second member with one of the unslotted ends only of the first member whereby not to interfere with the flexing of the slotted portion of said first member.

10. In a connecting means, a member having a longitudinally slotted portion and an unslotted portion beyond each end of said slotted portion, second and third members, and separate means connecting the said second and third members with the unslotted portions only of the first member whereby not to interfere with the flexing of the slotted portion thereof.

WILLIAM H. RICHARDSON.